US009643642B2

(12) United States Patent
Kuramochi

(10) Patent No.: US 9,643,642 B2
(45) Date of Patent: *May 9, 2017

(54) VEHICLE STEERING APPARATUS

(71) Applicant: HONDA MOTOR CO., LTD., Tokyo (JP)

(72) Inventor: Toshikatsu Kuramochi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,135

(22) Filed: Apr. 15, 2015

(65) Prior Publication Data
US 2015/0321692 A1    Nov. 12, 2015

(30) Foreign Application Priority Data

May 8, 2014  (JP) ................................ 2014-096497

(51) Int. Cl.
B62D 5/04         (2006.01)
B62D 5/00         (2006.01)
B62D 6/00         (2006.01)

(52) U.S. Cl.
CPC ........... *B62D 5/003* (2013.01); *B62D 5/0484* (2013.01); *B62D 5/0487* (2013.01); *B62D 5/0496* (2013.01); *B62D 6/008* (2013.01)

(58) Field of Classification Search
CPC ...... B62D 5/0496; B62D 6/008; B62D 5/003; B62D 5/0484
See application file for complete search history.

(56) References Cited

U.S. PATENT DOCUMENTS

2007/0205040 A1*  9/2007  Miyasaka ............. B62D 5/001
                                                                180/444
2013/0285587 A1* 10/2013  Takemoto ........... B62D 5/0496
                                                                318/473

FOREIGN PATENT DOCUMENTS

JP    2002-211425 A    7/2002
JP    2003-252227 A    9/2003

OTHER PUBLICATIONS

Japanese Office Action dated Nov. 29, 2016 (mailing date), issued in counterpart Japanese Patent Application No. 2014-096497 with English translation.

* cited by examiner

*Primary Examiner* — Yuen Wong
(74) *Attorney, Agent, or Firm* — Westerman, Hattori, Daniels & Adrian, LLP

(57) ABSTRACT

A vehicle steering apparatus includes a steering reaction force generating device including a steering reaction force motor, a turning device including a turning motor, a clutch device including an electromagnetic solenoid configured to mechanically engage and disengage the steering reaction force generating device and the turning device, a turning motor temperature sensor configured to detect a motor temperature value of the turning motor, a current integrated value acquiring unit configured to acquire a current integrated value of the turning motor, an abnormality diagnostic unit configured to diagnose whether the turning motor temperature sensor is normal, and a drive control unit configured to control the drive of the electromagnetic solenoid on the basis of the current integrated value of the turning motor acquired by the current integrated value acquiring unit if the abnormality diagnostic unit diagnoses the turning motor temperature sensor as being in an abnormal state.

10 Claims, 4 Drawing Sheets

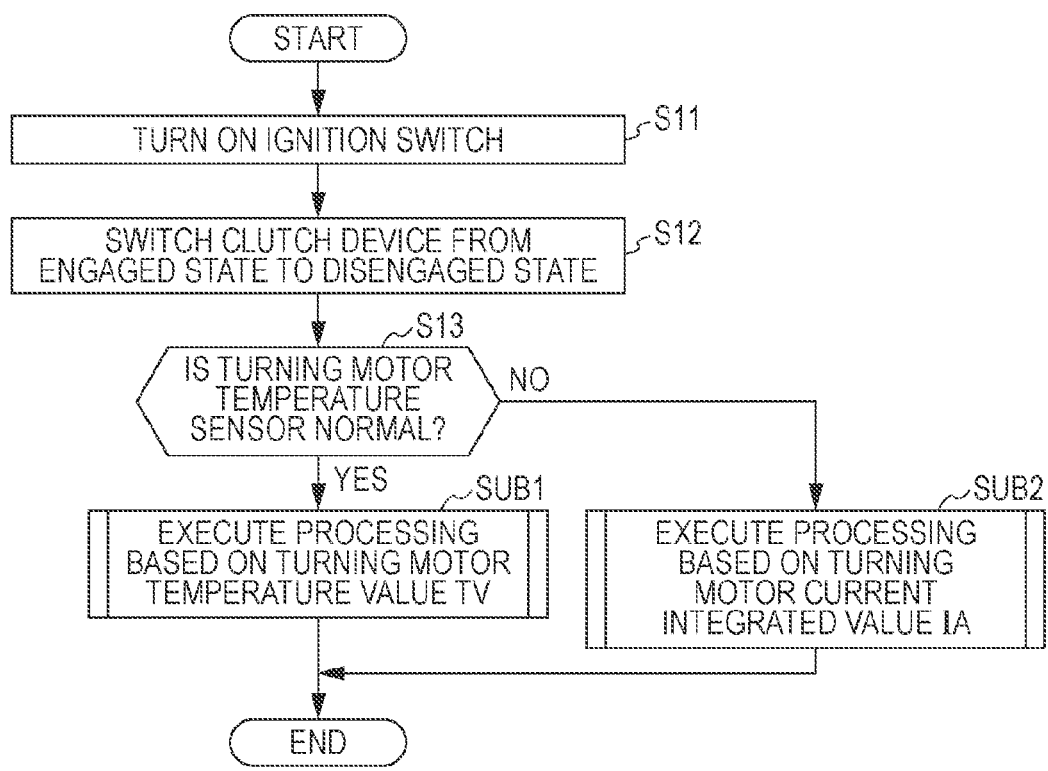

VEHICLE STEERING APPARATUS

CROSS REFERENCES TO RELATED APPLICATIONS

The present application claims priority under 35 U.S.C. §119 to Japanese Patent Application No. 2014-096497, filed May 8, 2014, entitled "Vehicle Steering Apparatus." The contents of this application are incorporated herein by reference in their entirety.

TECHNICAL FIELD

The present disclosure relates to a steer-by-wire vehicle steering apparatus.

BACKGROUND

Steering apparatuses of a so-called steer-by-wire type have been developed recently. Japanese Unexamined Patent Application Publication No. 2003-252227 discloses a steer-by-wire (SBW) vehicle steering apparatus.

In the SBW vehicle steering apparatus disclosed in Japanese Unexamined Patent Application Publication No. 2003-252227, a clutch device that engages and disengages a column shaft and a transmission shaft is interposed therebetween. The column shaft rotates in accordance with the operation of a steering wheel, and the transmission shaft rotates in accordance with the operation of a steering mechanism. On the basis of the drive state (motor temperature or motor current) of a turning motor for turning a pair of turning wheels, a steering control unit determines whether the turning motor is in an overload state. If the turning motor is determined to be in an overload state, the steering control unit switches the clutch device from a disengaged state to an engaged state to mechanically transmit the operating force of the steering wheel to the steering mechanism, which performs steering.

The SBW vehicle steering apparatus disclosed in Japanese Unexamined Patent Application Publication No. 2003-252227 can accurately suppress the occurrence of an overload in the turning motor.

In the SBW vehicle steering apparatus disclosed in Japanese Unexamined Patent Application Publication No. 2003-252227, for example, if a temperature value of the turning motor continues to be higher than a predetermined threshold for a predetermined period of time, the turning motor is assumed to be in an overload state and the clutch device is switched from the disengaged state to the engaged state.

However, with the configuration described above, for example, in the event of an abnormality in a temperature sensor for the turning motor, the turning motor which is actually in an overload state may be erroneously diagnosed as not being in an overload state. In this case, the time of switching of the clutch device from the disengaged state to the engaged state may become later than the original switching time, and this may allow an overload of the turning motor.

There is a demand for an accurate diagnosis of whether a motor is in an overload state. Such a demand exists not only for the turning motor, but also for a steering reaction force motor.

SUMMARY

The present application has been made in view of the circumstances described above. It is desirable to provide a vehicle steering apparatus capable of accurately diagnosing whether a motor for steering the vehicle is in an overload state even in the event of an abnormality in a temperature sensor for the motor.

To solve the problems described above, a vehicle steering apparatus according to a first aspect of the present disclosure includes a steering unit including a steering reaction force motor capable of applying a steering reaction force to a steering member operated for turning a pair of turning wheels of a vehicle; a turning unit including a turning motor configured to apply a turning force for turning the turning wheels, the turning unit being capable of turning the turning wheels while being mechanically disengaged from the steering unit; a clutch device including a switching actuator configured to mechanically engage and disengage the steering unit and the turning unit; a temperature sensor configured to detect a temperature value of one of the steering reaction force motor and the turning motor; a current integrated value acquiring unit configured to acquire a current integrated value of the one motor; an abnormality diagnostic unit configured to diagnose whether the temperature sensor is normal; and a control unit configured to control, when the clutch device is in a disengaged state, drive of the turning motor such that a turning angle is appropriate for an operating state of the steering member and drive of the steering reaction force motor such that a steering reaction force appropriate for a turning state of the turning unit is applied. If the abnormality diagnostic unit diagnoses the temperature sensor as being normal, the control unit controls drive of the switching actuator on the basis of the temperature value of the one motor detected by the temperature sensor, whereas if the abnormality diagnostic unit diagnoses the temperature sensor as being in an abnormal state, the control unit controls drive of the switching actuator on the basis of the current integrated value of the one motor acquired by the current integrated value acquiring unit.

Studies done by the present inventor have shown that, as well as a temperature value of a motor, a current integrated value of the motor is preferable as a measure of a load state of the motor.

According to the first aspect, in the event of an abnormality in the temperature sensor, the drive of the switching actuator is controlled on the basis of the current integrated value of the motor, instead of the temperature value of the motor. Therefore, even in the event of an abnormality in the temperature sensor for the motor for steering the vehicle, a diagnosis of whether the motor is in an overload state can be accurately made. As a result, since the period of steer-by-wire (SBW) mode in which the clutch device is in a disengaged state can be extended as much as possible, it is possible to contribute to improved reliability of the vehicle steering apparatus having SBW mode as a steering mode.

According to a second aspect of the present disclosure, the temperature sensor may detect a temperature value of the steering reaction force motor; the current integrated value acquiring unit may acquire a current integrated value of the steering reaction force motor; if the temperature sensor is diagnosed as being in an abnormal state, the abnormality diagnostic unit may diagnose whether the steering reaction force motor is in an overload state on the basis of the current integrated value of the steering reaction force motor acquired by the current integrated value acquiring unit; and if the abnormality diagnostic unit diagnoses the temperature sensor as being in an abnormal state and diagnoses the steering reaction force motor as being in an overload state, the control unit may control drive of the switching actuator to bring the clutch device into engagement.

According to the second aspect, in the event of an abnormality in the temperature sensor for the steering reaction force motor, a diagnosis of whether the steering reaction force motor is in an overload state is made on the basis of the current integrated value of the steering reaction force motor, instead of the temperature value of the steering reaction force motor. Therefore, even in the event of an abnormality in the temperature sensor for the steering reaction force motor, a diagnosis of whether the steering reaction force motor is in an overload state can be accurately made. As a result, since the period of SBW mode in which the clutch device is in a disengaged state can be extended as much as possible, it is possible to contribute to improved reliability of the vehicle steering apparatus having SBW mode as a steering mode, as in the vehicle steering apparatus of the first aspect.

According to a third aspect of the present disclosure, the temperature sensor may detect a temperature value of the turning motor; the current integrated value acquiring unit may acquire a current integrated value of the turning motor; if the temperature sensor is diagnosed as being in an abnormal state, the abnormality diagnostic unit may diagnose whether the turning motor is in an overload state on the basis of the current integrated value of the turning motor acquired by the current integrated value acquiring unit; and if the abnormality diagnostic unit diagnoses the temperature sensor as being in an abnormal state and diagnoses the turning motor as being in an overload state, the control unit may control drive of the switching actuator to bring the clutch device into engagement.

According to the third aspect, in the event of an abnormality in the temperature sensor for the turning motor, a diagnosis of whether the turning motor is in an overload state is made on the basis of the current integrated value of the turning motor, instead of the temperature value of the turning motor. Therefore, even in the event of an abnormality in the temperature sensor for the turning motor, a diagnosis of whether the turning motor is in an overload state can be accurately made. As a result, since the period of SBW mode in which the clutch device is in a disengaged state can be extended as much as possible, it is possible to contribute to improved reliability of the vehicle steering apparatus having SBW mode as a steering mode, as in the vehicle steering apparatus of the first aspect.

According to a fourth aspect of the present disclosure, during a period in which a current greater than a current threshold serving as a reference for determining whether the one motor can be heated flows through the one motor, the current integrated value acquiring unit computes a time integral of the current, whereas during a period in which a current smaller than the current threshold flows through the one motor, the current integrated value acquiring unit subtracts a current integrated value corresponding to a temperature decrease in this period, so as to acquire a current integrated value of the one motor.

According to the fourth aspect, in acquiring a current integrated value of the one motor, a change history of increases and decreases in the magnitude of the motor current is reflected in the current integrated value. Therefore, as compared to the case of the vehicle steering apparatus of the first aspect, a diagnosis of whether the one motor is in an overload state can be made more accurately and in a more timely manner.

According to a fifth aspect of the present disclosure, if the abnormality diagnostic unit diagnoses the temperature sensor as being in an abnormal state and if the current integrated value of the steering reaction force motor acquired by the current integrated value acquiring unit exceeds a first current integrated value threshold serving as a reference for determining whether the steering reaction force motor is normal but does not exceed a second current integrated value threshold, the control unit controls drive of the steering reaction force motor while regulating a current supplied to the steering reaction force motor in accordance with the current integrated value of the steering reaction force motor.

According to the fifth aspect, a current appropriate for a load state of the steering reaction force motor is supplied to the steering reaction force motor while being regulated in accordance with variation in the current integrated value of the steering reaction force motor. This makes it possible to accurately carry out steering control in SBW mode.

According to a sixth aspect of the present disclosure, if the abnormality diagnostic unit diagnoses the temperature sensor as being in an abnormal state and if the current integrated value of the turning motor acquired by the current integrated value acquiring unit exceeds a first current integrated value threshold serving as a reference for determining whether the turning motor is normal but does not exceed a second current integrated value threshold, the control unit controls drive of the turning motor while regulating a current supplied to the turning motor in accordance with the current integrated value of the turning motor.

According to the sixth aspect, a current appropriate for a load state of the turning motor is supplied to the turning motor while being regulated in accordance with variation in the current integrated value of the turning motor. This makes it possible to accurately carry out steering control in SBW mode.

According to one embodiment of the present disclosure, even in the event of an abnormality in the temperature sensor for a motor for steering the vehicle, a diagnosis of whether the motor is in an overload state can be accurately made.

BRIEF DESCRIPTION OF THE DRAWINGS

The advantages of the disclosure will become apparent in the following description taken in conjunction with the following drawings.

FIG. 2A is a flowchart illustrating how a control device operates when the steering mode of the vehicle steering apparatus is SBW mode.

DETAILED DESCRIPTION

Embodiments of the present disclosure will now be described in detail with reference to the drawings.

Figure 1:
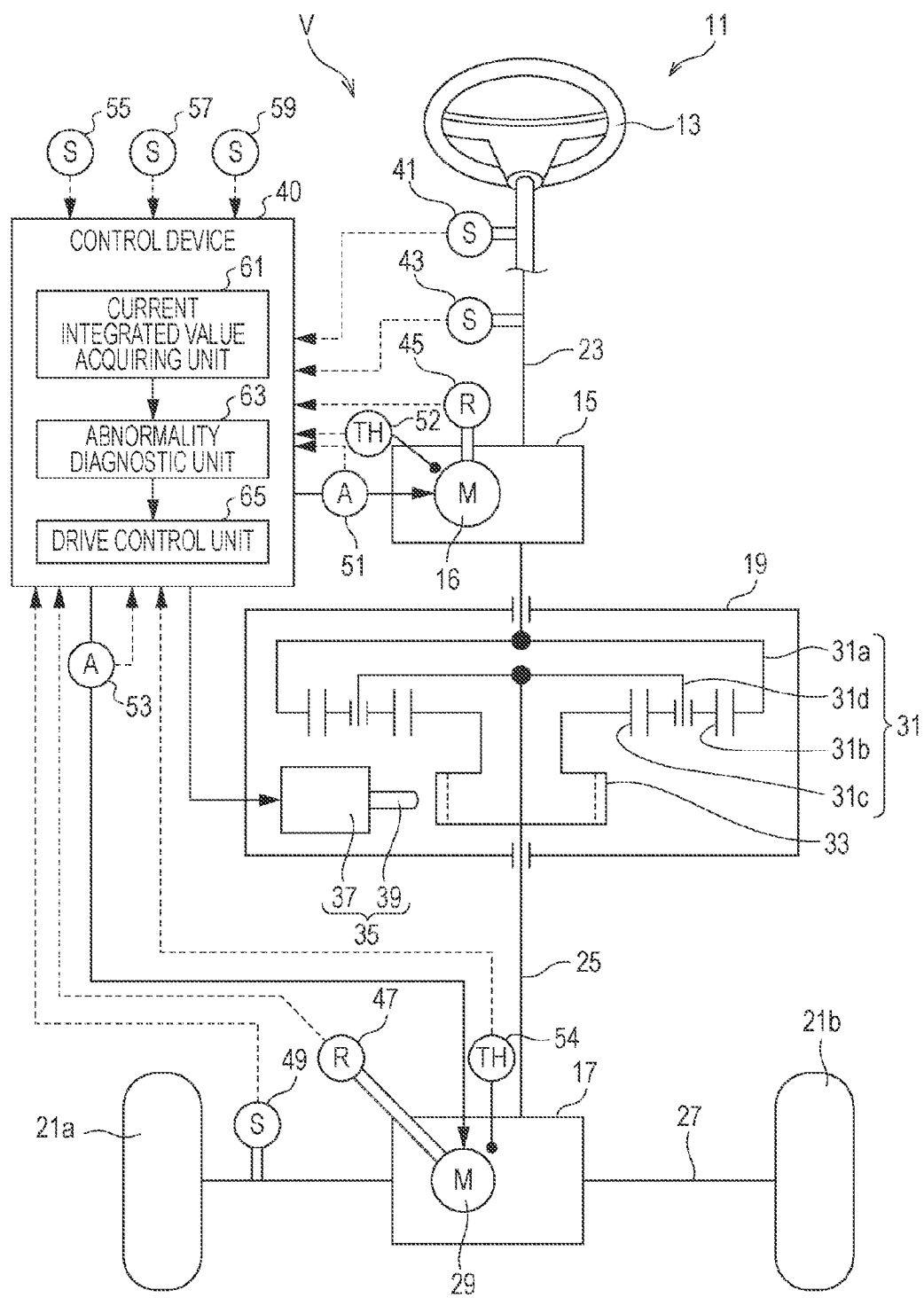
FIG. 1 is a schematic diagram of a vehicle steering apparatus according to an embodiment of the present disclosure.

FIG. 1 is a schematic diagram of a vehicle steering apparatus according to an embodiment of the present disclosure. A vehicle steering apparatus 11 is a steer-by-wire (SBW) steering apparatus. The vehicle steering apparatus 11 has a function (SBW mode) in which a turning force is generated by driving a turning motor 29 (described below); an electronic power steering (EPS) function (EPS mode) in which, for example during failure of a steering reaction force motor 16 (described below), an auxiliary force for driver's manual steering is generated by driving the turning motor 29; and a function (manual steering mode) which allows driver's manual steering, for example, during failure of the steering reaction force motor 16 and the turning motor 29.

To implement the functions described above, the vehicle steering apparatus 11 includes a steering wheel 13, a steering reaction force generating device 15, a turning device 17, and a clutch device 19 as illustrated in FIG. 1. The vehicle steering apparatus 11 is mounted on a vehicle V. The vehicle V includes a pair of turning wheels 21a and 21b.

The steering wheel 13 is operated in accordance with the driver's driving intention for steering. The steering wheel 13 corresponds to, for example, "steering member" of the present disclosure. The steering wheel 13 is provided with a steering shaft 23. The steering shaft 23 is configured to rotate about its axis in accordance with the driver's operation of the steering wheel 13.

When the vehicle steering apparatus 11 operates in SBW mode, the steering reaction force generating device 15 generates a steering reaction force (resistance) at the hands of the driver holding the steering wheel 13. The steering reaction force generating device 15 includes the steering reaction force motor 16, to which the steering shaft 23 is coupled. The steering reaction force motor 16 generates a steering torque for rotating the steering shaft 23 about its axis. Thus, when the vehicle steering apparatus 11 operates in SBW mode, a steering reaction force (resistance) is transmitted to the hands of the driver holding the steering wheel 13.

The steering wheel 13, the steering shaft 23, and the steering reaction force generating device 15 including the steering reaction force motor 16 correspond to, for example, "steering unit" of the present disclosure.

The turning device 17 uses a rack-and-pinion mechanism (not shown) to convert a rotational motion of a turning shaft 25 into a linear motion of a rack shaft 27. The turning device 17 includes the turning motor 29, to which the turning shaft 25 and the rack shaft 27 are coupled. The turning motor 29 generates a turning torque for the linear motion of the rack shaft 27 in the axial direction. The pair of turning wheels 21a and 21b is coupled to the rack shaft 27 via a tie rod (not shown). The turning wheels 21a and 21b are turned by the linear motion of the rack shaft 27.

The turning shaft 25, the rack shaft 27, and the turning device 17 including the turning motor 29 correspond to, for example, "turning unit" of the present disclosure.

The clutch device 19 is capable of engaging and disengaging the steering shaft 23 and the turning shaft 25. The clutch device 19 includes a planetary gear mechanism 31 to realize this capability. The planetary gear mechanism 31 includes an annular internal gear 31a, a plurality of planetary gears 31b, a sun gear 31c, and a planetary carrier 31d.

The clutch device 19 includes a lock annular gear 33 and a lock device 35, which is composed of a lock pin 39 and an electromagnetic solenoid 37. The lock pin 39 can be engaged with and disengaged from a tooth groove of the lock annular gear 33. The electromagnetic solenoid 37 drives the lock pin 39 back and forth in a reciprocating manner.

The annular internal gear 31a is secured to the steering shaft 23 at a side end portion of the turning device 17. The annular internal gear 31a is configured to rotate coaxially with the steering shaft 23 in an integrated manner. The sun gear 31c is configured to freely rotate coaxially with the turning shaft 25. The plurality of (e.g., three) planetary gears 31b are disposed in an annular space between the annular internal gear 31a and the sun gear 31c. The planetary gears 31b are evenly spaced and engage with the annular internal gear 31a and the sun gear 31c. Each of the planetary gears 31b is rotatably supported by the planetary carrier 31d that rotates coaxially with the turning shaft 25 in an integrated manner.

The lock annular gear 33 is an external gear. The lock annular gear 33 is configured to rotate coaxially with the sun gear 31c in an integrated manner. The lock pin 39 is biased toward the lock annular gear 33 by a biasing unit (not shown). When the lock pin 39 is engaged in a tooth groove of the lock annular gear 33, the rotational motion of the lock annular gear 33 is restrained.

The electromagnetic solenoid 37 is supplied with an exciting current and displaces the lock pin 39 to retract and disengage the lock pin 39 from the lock annular gear 33. The electromagnetic solenoid 37 corresponds to, for example, "switching actuator" of the present disclosure.

The lock device 35 is configured to operate in accordance with a control signal from a control device 40. The control device 40 supplies an exciting current to the electromagnetic solenoid 37 to disengage the lock pin 39 from the lock annular gear 33.

The function of the clutch device 19 will now be described. When the lock pin 39 is engaged in a tooth groove of the lock annular gear 33, the rotational motion of the sun gear 31c rotating coaxially with the lock annular gear 33 in an integrated manner is restrained.

When the driver operates the steering wheel 13 with the rotational motion of the sun gear 31c restrained, the annular internal gear 31a rotates as the steering shaft 23 rotates. Since the rotational motion of the sun gear 31c is restrained at this point, the planetary gears 31b revolve about the sun gear 31c while rotating on their axes. The revolving of the planetary gears 31b causes rotation of the planetary carrier 31d supporting the planetary gears 31b and the turning shaft 25 rotating in an integrated manner with the planetary carrier 31d.

When the lock pin 39 is engaged in a tooth groove of the lock annular gear 33, the clutch device 19 is in an engaged state which allows engagement between the steering shaft 23 and the turning shaft 25. In this state, the rotational force of the steering shaft 23 is transmitted to the turning shaft 25.

On the other hand, when the lock pin 39 is disengaged from a tooth groove of the lock annular gear 33, the sun gear 31c rotating in an integrated manner with the lock annular gear 33 becomes freely rotatable.

When the driver operates the steering wheel 13 with the sun gear 31c being freely rotatable, the annular internal gear 31a rotates as the steering shaft 23 rotates. The planetary gears 31b then try to revolve about the sun gear 31c while rotating on their axes. However, the turning wheels 21a and 21b are coupled via the turning shaft 25 and the rack shaft 27 to the planetary carrier 31d. Therefore, the resistance to the rotation of the planetary carrier 31d is much larger than the resistance to the rotation of the sun gear 31c in a freely rotatable state. Thus, when the planetary gears 31b rotate on their axes, the sun gear 31c rotates (on its axis) and the planetary carrier 31d does not rotate. This means that the turning shaft 25 does not rotate.

That is, when the lock pin 39 is disengaged from a tooth groove of the lock annular gear 33, the clutch device 19 is in a disengaged state which allows separation between the steering shaft 23 and the turning shaft 25. In this state, the rotational force of the steering shaft 23 is not transmitted to the turning shaft 25.

Next, an input and output system for the control device 40 will be described.

An input system connected to the control device 40 includes a steering angle sensor 41, a steering torque sensor 43, a steering reaction force motor resolver 45, a turning motor resolver 47, a rack stroke sensor 49, a steering reaction force motor current sensor 51, a steering reaction force motor temperature sensor 52, a turning motor current sensor 53, a turning motor temperature sensor 54, a vehicle speed sensor 55, a yaw rate sensor 57, and an acceleration sensor 59.

The steering angle sensor 41 and the steering torque sensor 43 are mounted on the steering shaft 23. The steering angle sensor 41 detects a steering angle of the steering wheel 13 operated by the driver, and provides the detected steering angle information to the control device 40. The steering torque sensor 43 detects a steering torque of the steering wheel 13 operated by the driver, and provides the detected steering torque information to the control device 40.

The steering reaction force motor resolver 45 is mounted on the steering reaction force motor 16. The steering reaction force motor resolver 45 detects the amount of rotational operation (steering angle) of the steering reaction force motor 16, and provides the detected steering angle information to the control device 40.

The turning motor resolver 47 is mounted on the turning motor 29. The turning motor resolver 47 detects the amount of rotational operation (turning angle) of the turning motor 29, and provides the detected turning angle information to the control device 40.

The rack stroke sensor 49 is mounted on the rack shaft 27. The rack stroke sensor 49 detects the amount of linear travel (turning angle) of the rack shaft 27, and provides the detected turning angle information to the control device 40.

The steering reaction force motor current sensor 51 detects a steering reaction force motor current supplied to the steering reaction force motor 16, and provides the detected steering reaction force motor current information to the control device 40.

The steering reaction force motor temperature sensor 52 detects a temperature of the steering reaction force motor 16 (e.g., a temperature detected by a thermistor on a control board for controlling the drive of the steering reaction force motor 16), and provides the detected steering reaction force motor temperature information (temperature value) to the control device 40. The steering reaction force motor temperature sensor 52 corresponds to, for example, "temperature sensor" of the present disclosure.

The turning motor current sensor 53 detects a turning motor current supplied to the turning motor 29, and provides the detected turning motor current information to the control device 40.

The turning motor temperature sensor 54 detects a temperature of the turning motor 29 (e.g., a temperature detected by a thermistor on a control board for controlling the drive of the turning motor 29), and provides the detected turning motor temperature information (temperature value) to the control device 40. The turning motor temperature sensor 54 corresponds to, for example, "temperature sensor" of the present disclosure.

The vehicle speed sensor 55 detects the speed (vehicle speed) of the vehicle V, and provides the detected vehicle speed information to the control device 40. The yaw rate sensor 57 detects a yaw rate of the vehicle V, and provides the detected yaw rate information to the control device 40. The acceleration sensor 59 detects lateral acceleration (lateral G) and longitudinal acceleration (longitudinal G) of the vehicle V, and provides the detected lateral G information and longitudinal G information to the control device 40.

An output system connected to the control device 40 includes the steering reaction force motor 16, the turning motor 29, and the electromagnetic solenoid 37.

The control device 40 is capable of determining the steering mode of the vehicle steering apparatus 11 to be any of SBW mode, EPS mode, and manual steering mode on the basis of, for example, a temperature or current detection signal input via the input system and an abnormality diagnosis of various functional members of the vehicle steering apparatus 11; generating a control signal for controlling the drive of each of the steering reaction force motor 16, the turning motor 29, and the electromagnetic solenoid 37 in accordance with the determined steering mode; and controlling the drive of each of the steering reaction force motor 16, the turning motor 29, and the electromagnetic solenoid 37 on the basis of the generated control signal.

When the vehicle steering apparatus 11 operates in SBW mode, the control device 40 controls the drive of the steering reaction force motor 16 to transmit a reaction force (resistance) for appropriate steering to the hands of the driver holding the steering wheel 13.

When the vehicle steering apparatus 11 operates in SBW mode, the control device 40 controls the drive of the turning motor 29 to turn the turning wheels 21*a* and 21*b* in accordance with the driver's driving intention.

The control device 40 is also capable of diagnosing whether a motor for steering the vehicle V (steering reaction force motor 16 or turning motor 29) is in an overload state on the basis of a temperature value of the steering reaction force motor 16 or the turning motor 29.

The control device 40 is also capable of acquiring an integrated value (time integral value) of a motor current supplied to a motor for steering the vehicle V (steering reaction force motor 16 or turning motor 29), and diagnosing whether the steering reaction force motor 16 or the turning motor 29 is in an overload state on the basis of the motor current integrated value of the steering reaction force motor 16 or the turning motor 29.

Specifically, the control device 40 includes a current integrated value acquiring unit 61, a abnormality diagnostic unit 63, and a drive control unit 65.

The current integrated value acquiring unit 61 is capable of acquiring an integrated value of a steering reaction force motor current flowing through the steering reaction force motor 16 and an integrated value of a turning motor current flowing through the turning motor 29. Specifically, for example, in acquiring an integrated value of a motor current of the turning motor 29 (hereinafter referred to as "turning motor current integrated value IA"), during a period in which a current greater than a current threshold Ath serving as a reference for determining whether the turning motor 29 can be heated flows through the turning motor 29, the current integrated value acquiring unit 61 computes the time integral of the current, whereas during a period in which a current smaller than the current threshold Ath flows through the turning motor 29, the current integrated value acquiring unit 61 subtracts a current integrated value corresponding to a temperature decrease in this period, so as to acquire the turning motor current integrated value IA. This will be described in detail later on.

The abnormality diagnostic unit 63 is capable of diagnosing whether the steering reaction force motor 16 is in an overload state on the basis of a temperature value of the steering reaction force motor 16 (hereinafter referred to as "steering reaction force motor temperature value"), and diagnosing whether the turning motor 29 is in an overload state on the basis of a temperature value of the turning motor 29 (hereinafter referred to as "turning motor temperature value TV"). Specifically, for example, in diagnosing whether the turning motor 29 is in an overload state, the abnormality diagnostic unit 63 determines whether the turning motor temperature value TV exceeds a predetermined second turning motor temperature threshold TVth2 (described in detail below). Then, if the turning motor temperature value TV is determined to exceed the second turning motor temperature threshold TVth2, the abnormality diagnostic unit 63 diagnoses the turning motor 29 as being in an overload state. In the same procedure as above, the abnormality diagnostic unit 63 diagnoses whether the steering reaction force motor 16 is in an overload state on the basis of the steering reaction force motor temperature value.

The abnormality diagnostic unit 63 is also capable of diagnosing whether the steering reaction force motor 16 is in an overload state on the basis of an integrated value of a motor current of the steering reaction force motor 16 (hereinafter referred to as "steering reaction force motor current integrated value"), and diagnosing whether the turning motor 29 is in an overload state on the basis of the turning motor current integrated value IA. Specifically, for example, in diagnosing whether the turning motor 29 is in an overload state, the abnormality diagnostic unit 63 determines whether the turning motor current integrated value IA exceeds a predetermined second current integrated value threshold IAth2 (described in detail below). Then, if the turning motor current integrated value IA is determined to exceed the second current integrated value threshold IAth2, the abnormality diagnostic unit 63 diagnoses the turning motor 29 as being in an overload state. In the same procedure as above, the abnormality diagnostic unit 63 diagnoses whether the steering reaction force motor 16 is in an overload state on the basis of the steering reaction force motor current integrated value.

For example, if the abnormality diagnostic unit 63 diagnoses the turning motor temperature sensor 54 as being normal, and if the turning motor temperature value TV detected by the turning motor temperature sensor 54 exceeds a predetermined first turning motor temperature threshold TVth1 (serving as a reference value for determining whether the turning motor 29 is in a heavy load state) but does not exceed the second turning motor temperature threshold TVth2 (serving as a reference value for determining whether the turning motor 29 is in an overload state exceeding the heavy load state), the drive control unit 65 is capable of controlling the drive of the turning motor 29 while regulating the current supplied to the turning motor 29 in accordance with the turning motor temperature value TV.

On the other hand, for example, if the abnormality diagnostic unit 63 diagnoses the turning motor temperature sensor 54 as being in an abnormal state, and if the turning motor current integrated value IA acquired by the current integrated value acquiring unit 61 exceeds a predetermined first current integrated value threshold IAth1 (serving as a reference value for determining whether the turning motor 29 is in a heavy load state) but does not exceed the second current integrated value threshold IAth2 (serving as a reference value for determining whether the turning motor 29 is in an overload state exceeding the heavy load state), the drive control unit 65 is capable of controlling the drive of the turning motor 29 while regulating the current supplied to the turning motor 29 in accordance with the turning motor current integrated value IA. The drive control unit 65 is also capable of controlling the drive of the steering reaction force motor 16 in the same procedure as above.

If the abnormality diagnostic unit 63 diagnoses one of the steering reaction force motor 16 and the turning motor 29 as being in an overload state, the drive control unit 65 is capable of controlling the drive of the electromagnetic solenoid 37 to bring the clutch device 19 into engagement. Specifically, for example, if the abnormality diagnostic unit 63 diagnoses the turning motor 29 as being in an overload state, the drive control unit 65 is capable of controlling the drive of the electromagnetic solenoid 37 to bring the clutch device 19 into engagement. Specifically, for example, if the abnormality diagnostic unit 63 diagnoses the turning motor 29 as being in an overload state, the drive control unit 65 is capable of controlling the drive of the electromagnetic solenoid 37 such that the clutch device 19 switches from the disengaged state (SBW mode) to the engaged state (non-SBW mode).

Figure 2B:
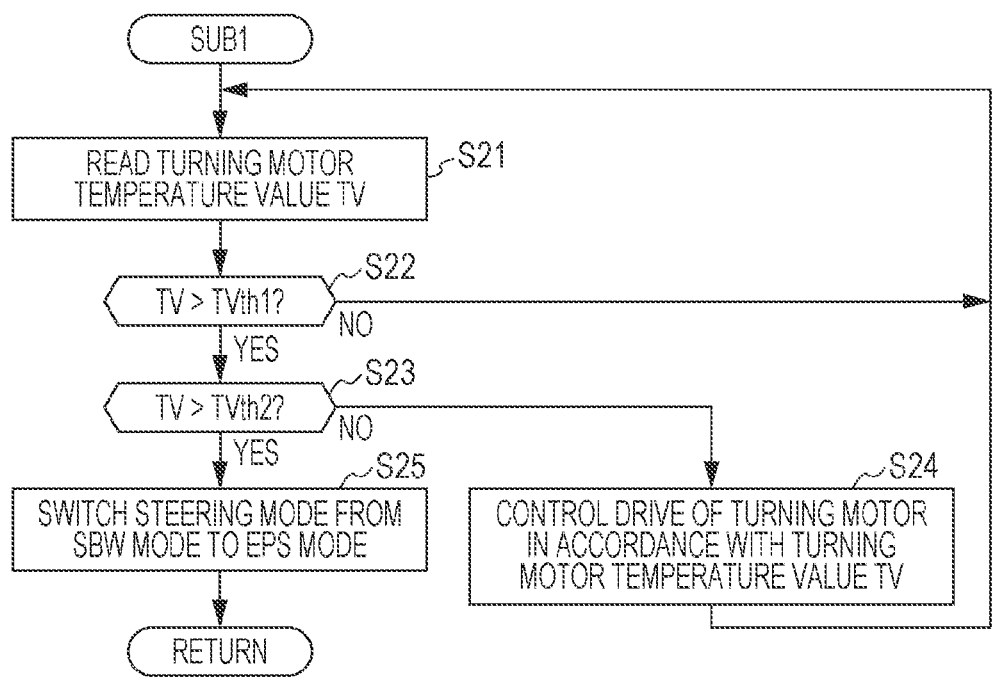
FIG. 2B is another flowchart illustrating how the control device operates when the steering mode of the vehicle steering apparatus is SBW mode.
Figure 2C:
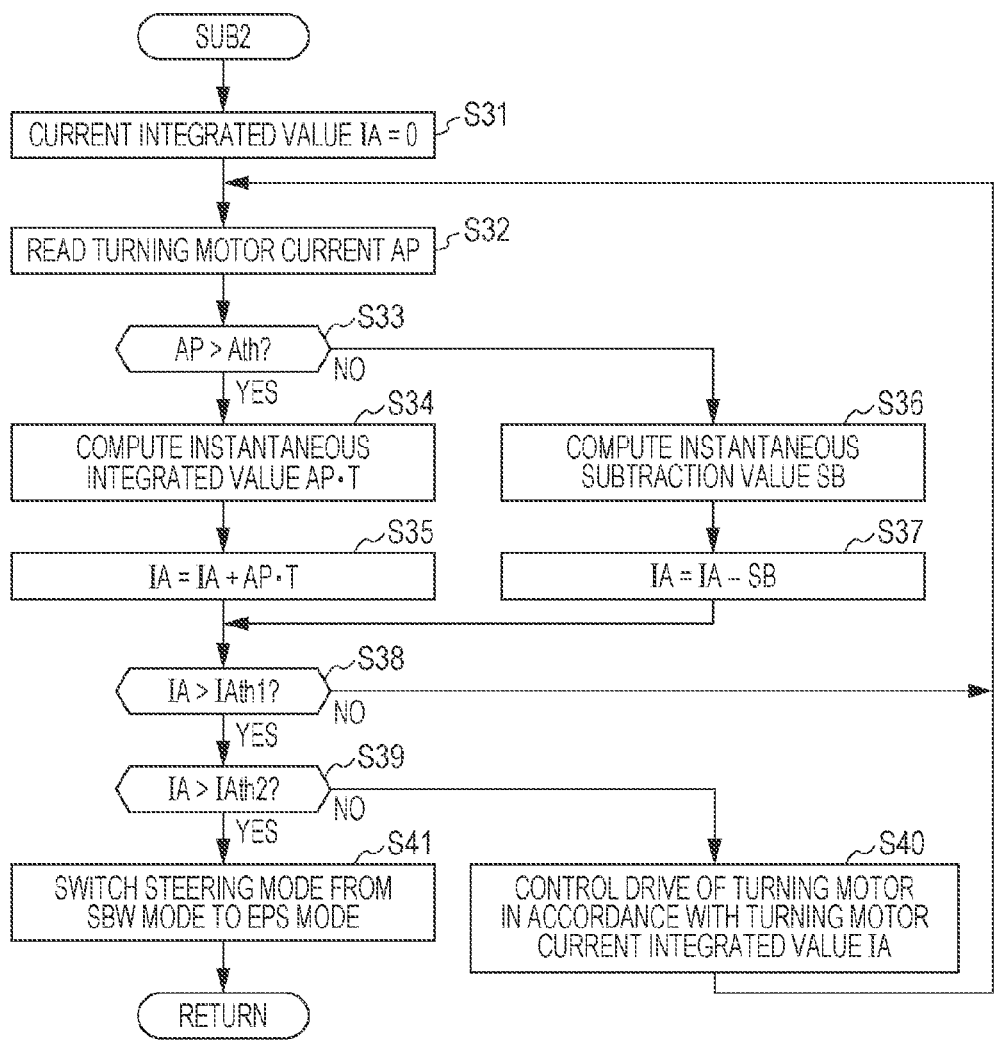
FIG. 2C is another flowchart illustrating how the control device operates when the steering mode of the vehicle steering apparatus is SBW mode.

With reference to FIGS. 2A to 2C, a description will be given of how the control device 40 operates when the steering mode of the vehicle steering apparatus 11 is SBW mode. Of the motors (steering reaction force motor 16 and turning motor 29) for steering the vehicle V, the turning motor 29 is diagnosed, in this example, by the abnormality diagnostic unit 63 to determine whether it is in an overload state.

As shown in FIG. 2A, after an ignition switch (IG SW) is turned on (step S11), the drive control unit 65 of the control device 40 controls the drive of the electromagnetic solenoid 37 such that the clutch device 19 which is in an engaged state (non-SBW mode) when the IG SW is off switches to a disengaged state (SBW mode) (step S12).

In step S13, the abnormality diagnostic unit 63 of the control device 40 determines whether the turning motor temperature sensor 54 is normal. If the turning motor temperature sensor 54 is determined to be normal (YES in step S13), the control device 40 causes the processing to proceed to subroutine SUB1. On the other hand, if the turning motor temperature sensor 54 is determined to be in an abnormal state (NO in step S13), the control device 40 causes the processing to proceed to subroutine SUB2. After the processing of subroutine SUB1 or SUB2, the control device 40 ends the series of processing steps.

Next, the processing of subroutine SUB1 will be described with reference to FIG. 2B.

In step S21 of subroutine SUB1, the control device 40 reads the turning motor temperature value TV detected by the turning motor temperature sensor 54.

In step S22, the abnormality diagnostic unit 63 of the control device 40 determines whether the turning motor temperature value TV exceeds the first turning motor temperature threshold TVth1. For example, the first turning motor temperature threshold TVth1 may be experimentally set on the basis of a temperature value at which the turning motor 29 would need to be monitored.

If the turning motor temperature value TV is determined to exceed the first turning motor temperature threshold TVth1 (YES in step S22), the control device 40 causes the processing to proceed to step S23. On the other hand, if the turning motor temperature value TV is determined not to exceed the first turning motor temperature threshold TVth1 (NO in step S22), the control device 40 returns the processing of subroutine SUB1 to step S21, from which the subsequent steps are performed.

In step S23, the abnormality diagnostic unit 63 of the control device 40 determines whether the turning motor temperature value TV exceeds the second turning motor temperature threshold TVth2. For example, the second turning motor temperature threshold TVth2 may be experimentally set on the basis of a durability critical temperature value of the turning motor 29 (i.e., a predetermined boundary temperature at which the turning motor 29 goes into an overload state).

If the turning motor temperature value TV is determined to exceed the second turning motor temperature threshold TVth2 (YES in step S23), the control device 40 causes the processing to jump to step S25. On the other hand, if the turning motor temperature value TV is determined not to exceed the second turning motor temperature threshold TVth2 (NO in step S23), the control device 40 causes the processing to proceed to step S24.

In step S24, the drive control unit 65 of the control device 40 controls the drive of the turning motor 29 while regulating the current supplied to the turning motor 29 in accordance with the turning motor temperature value TV. Then, the control device 40 returns the processing of subroutine SUB1 to step S21, from which the subsequent steps are performed.

In step S25, the drive control unit 65 of the control device 40 controls the drive of the electromagnetic solenoid 37 such that the clutch device 19 switches from the disengaged state (SBW mode) to the engaged state (non-SBW mode). Then, the control device 40 ends the processing of subroutine SUB1 and returns the processing to the main routine in FIG. 2A.

The processing of subroutine SUB2 will now be described with reference to FIG. 2C.

In step S31 of subroutine SUB2, the control device 40 resets the turning motor current integrated value IA stored in a storage unit, such as an internal register, to "0".

In step S32, the current integrated value acquiring unit 61 of the control device 40 reads a turning motor current AP detected by the turning motor current sensor 53. Steps S32 to S39 are repeated with a predetermined period (cycle time) T until the determination in step S38 (described below) becomes "YES".

In step S33, the current integrated value acquiring unit 61 of the control device 40 determines whether the turning motor current AP read in step S32 exceeds the current threshold Ath serving as a reference for determining whether the turning motor 29 can be heated. For example, the current threshold Ath may be experimentally set on the basis of the turning motor current AP measured when the temperature of the main body of the turning motor 29 begins to rise by supplying the turning motor current AP to the turning motor 29 while gradually increasing it.

If the turning motor current AP is determined to exceed the current threshold Ath (YES in step S33), the control device 40 causes the processing to proceed to step S34. On the other hand, if the turning motor current AP is determined not to exceed the current threshold Ath (NO in step S33), the control device 40 causes the processing to jump to step S36.

In step S34, the current integrated value acquiring unit 61 of the control device 40 computes an instantaneous integrated value AP·T by multiplying the turning motor current AP read in step S32 by the predetermined period (cycle time) T. The instantaneous integrated value AP·T corresponds to a time integral value of the turning motor current AP.

In step S35, the current integrated value acquiring unit 61 of the control device 40 computes the turning motor current integrated value IA in the current cycle time by adding the instantaneous integrated value AP·T determined in step S34 to the turning motor current integrated value IA in the previous cycle time.

On the other hand, in step S36, the current integrated value acquiring unit 61 of the control device 40 converts the turning motor current AP read in step S32 to compute an instantaneous subtraction value SB corresponding to a temperature decrease in the current cycle time.

In step S37, the current integrated value acquiring unit 61 of the control device 40 subtracts the instantaneous subtraction value SB determined in step S36 from the turning motor current integrated value IA in the previous cycle time to compute the turning motor current integrated value IA which reflects the temperature decrease history in the current cycle time. When the turning motor current AP read in step S32 is supplied to the turning motor 29, the temperature of the main body of the turning motor 29 decreases. When the turning motor current integrated value IA is computed in step S37 by taking this temperature decrease into consideration, the precision of the turning motor current integrated value IA can be improved.

In step S38, the abnormality diagnostic unit 63 of the control device 40 determines whether the turning motor current integrated value IA determined in step S35 or S37 exceeds the first current integrated value threshold IAth1. For example, the first current integrated value threshold IAth1 may be experimentally set on the basis of the turning motor current integrated value IA at which, by gradually increasing the turning motor current integrated value IA, the temperature of the main body of the turning motor 29 reaches a temperature at which the turning motor 29 needs to be monitored.

If the turning motor current integrated value IA determined in step S35 or S37 is determined not to exceed the first current integrated value threshold IAth1 (NO in step S38), the control device 40 returns the processing of subroutine SUB2 to step S32, from which the subsequent steps are performed. On the other hand, if the turning motor current integrated value IA determined in step S35 or S37 is determined to exceed the first current integrated value threshold IAth1 (YES in step S38), the control device 40 causes the processing to proceed to step S39.

In step S39, the abnormality diagnostic unit 63 of the control device 40 determines whether the turning motor current integrated value IA determined in step S35 or S37 exceeds the second current integrated value threshold IAth2. For example, the second current integrated value threshold IAth2 may be experimentally set on the basis of the turning motor current integrated value IA at which, by gradually increasing the turning motor current integrated value IA, the temperature of the main body of the turning motor 29 reaches a durability critical temperature value (i.e., a predetermined boundary temperature at which the turning motor 29 goes into an overload state).

If the turning motor current integrated value IA determined in step S35 or S37 is determined not to exceed the second current integrated value threshold IAth2 (NO in step S39), the control device 40 causes the processing to proceed to step S40. On the other hand, if the turning motor current integrated value IA determined in step S35 or S37 is determined to exceed the second current integrated value threshold IAth2 (YES in step S39), the control device 40 causes the processing to jump to step S41.

In step S40, the drive control unit 65 of the control device 40 controls the drive of the turning motor 29 while regulating the current supplied to the turning motor 29 in accordance with the turning motor current integrated value IA. Then, the control device 40 returns the processing of subroutine SUB2 to step S32, from which the subsequent steps are performed.

In step S41, the drive control unit 65 of the control device 40 controls the drive of the electromagnetic solenoid 37 such that the clutch device 19 switches from the disengaged state (SBW mode) to the engaged state (non-SBW mode). Then, the control device 40 ends the processing of subroutine SUB2 and returns the processing to the main routine in FIG. 2A.

(Effect of Vehicle Steering Apparatus 11 of Embodiment)

A vehicle steering apparatus 11 based on a first perspective includes a steering reaction force generating device (steering unit) 15 including a steering reaction force motor 16 capable of applying a steering reaction force to a steering wheel (steering member) 13 operated for turning a pair of turning wheels 21a and 21b of a vehicle V; a turning device (turning unit) 17 including a turning motor 29 configured to apply a turning force for turning the turning wheels 21a and 21b, the turning device (turning unit) 17 being capable of turning the turning wheels 21a and 21b while being mechanically disengaged from the steering reaction force generating device (steering unit) 15; a clutch device 19 including an electromagnetic solenoid (switching actuator) 37 configured to mechanically engage and disengage the steering reaction force generating device (steering unit) 15 and the turning device (turning unit) 17; temperature sensors 52 and 54 configured to detect temperature values of the steering reaction force motor 16 and the turning motor 29, respectively; a current integrated value acquiring unit 61 configured to acquire a current integrated value of one of the steering reaction force motor 16 and the turning motor 29; an abnormality diagnostic unit 63 configured to diagnose whether the temperature sensors 52 and 54 are normal; and a drive control unit (control unit) 65 configured to control, when the clutch device 19 is in a disengaged state, the drive of the turning motor 29 such that a turning angle is appropriate for the operating state of the steering wheel (steering member) 13 and the drive of the steering reaction force motor 16 such that a steering reaction force appropriate for the turning state of the turning device (turning unit) 17 is applied. If the abnormality diagnostic unit 63 diagnoses the temperature sensors 52 and 54 as being normal, the drive control unit (control unit) 65 controls the drive of the electromagnetic solenoid (switching actuator) 37 on the basis of the temperature value of one of the motors 16 and 29 detected by the temperature sensor 52 or 54. If the abnormality diagnostic unit 63 diagnoses the temperature sensors 52 and 54 as being in an abnormal state, the drive control unit (control unit) 65 controls the drive of the electromagnetic solenoid (switching actuator) 37 on the basis of the current integrated value of one of the motors 16 and 29 acquired by the current integrated value acquiring unit 61.

In the vehicle steering apparatus 11 based on the first perspective, if the abnormality diagnostic unit 63 diagnoses the temperature sensors 52 and 54 as being normal, the drive of the electromagnetic solenoid (switching actuator) 37 is controlled on the basis of the temperature value of one of the motors 16 and 29 detected by the temperature sensor 52 or 54. If the abnormality diagnostic unit 63 diagnoses the temperature sensors 52 and 54 as being in an abnormal state, the drive of the electromagnetic solenoid (switching actuator) 37 is controlled on the basis of the current integrated value of one of the motors 16 and 29 acquired by the current integrated value acquiring unit 61.

Studies done by the present inventor have shown that, as well as a motor temperature value, a motor current integrated value is preferable as a measure of a load state of the motor.

According to the vehicle steering apparatus 11 based on the first perspective, in the event of an abnormality in the temperature sensors 52 and 54, the drive of the electromagnetic solenoid (switching actuator) 37 is controlled on the basis of the motor current integrated value, instead of the motor temperature value. Therefore, even in the event of an abnormality in the temperature sensors 52 and 54 for the motors 16 and 29 for steering the vehicle V, a diagnosis of whether the motors 16 and 29 are in an overload state can be accurately made. As a result, since the period of SBW mode in which the clutch device 19 is in a disengaged state can be extended as much as possible, it is possible to contribute to improved reliability of the vehicle steering apparatus 11 having SBW mode as a steering mode.

The vehicle steering apparatus 11 based on a second perspective may adopt a configuration in which the steering reaction force motor temperature sensor 52 detects a temperature value of the steering reaction force motor 16; the current integrated value acquiring unit 61 acquires a current integrated value of the steering reaction force motor 16; if the steering reaction force motor temperature sensor 52 is diagnosed as being in an abnormal state, the abnormality diagnostic unit 63 diagnoses whether the steering reaction force motor 16 is in an overload state on the basis of the current integrated value of the steering reaction force motor 16 acquired by the current integrated value acquiring unit 61; and if the abnormality diagnostic unit 63 diagnoses the steering reaction force motor temperature sensor 52 as being in an abnormal state and also diagnoses the steering reaction force motor 16 as being in an overload state, the drive control unit (control unit) 65 controls the drive of the electromagnetic solenoid (switching actuator) 37 to bring the clutch device 19 into engagement.

In the vehicle steering apparatus 11 based on the second perspective, the steering reaction force motor temperature sensor 52 detects a temperature value of the steering reaction force motor 16, and the current integrated value acquiring unit 61 acquires a current integrated value of the steering reaction force motor 16. If the steering reaction force motor temperature sensor 52 is diagnosed as being in an abnormal state, the abnormality diagnostic unit 63 diagnoses whether the steering reaction force motor 16 is in an overload state on the basis of the steering reaction force motor current integrated value acquired by the current integrated value acquiring unit 61. If the abnormality diagnostic unit 63 diagnoses the steering reaction force motor temperature sensor 52 as being in an abnormal state and also diagnoses the steering reaction force motor 16 as being in an overload state on the basis of the steering reaction force motor current integrated value (e.g., if the current integrated value of the steering reaction force motor 16 exceeds the second current integrated value threshold IAth2), the drive control unit (control unit) 65 controls the drive of the electromagnetic solenoid (switching actuator) 37 to bring the clutch device 19 into engagement.

According to the vehicle steering apparatus 11 based on the second perspective, in the event of an abnormality in the steering reaction force motor temperature sensor 52, a diagnosis of whether the steering reaction force motor 16 is in an overload state is made on the basis of the steering reaction force motor current integrated value, instead of the steering reaction force motor temperature value. Therefore, even in the event of an abnormality in the steering reaction force motor temperature sensor 52, a diagnosis of whether the steering reaction force motor 16 is in an overload state can be accurately made. As a result, since the period of SBW mode in which the clutch device 19 is in a disengaged state can be extended as much as possible, it is possible to contribute to improved reliability of the vehicle steering apparatus 11 having SBW mode as a steering mode, as in the vehicle steering apparatus 11 based on the first perspective.

The vehicle steering apparatus 11 based on a third perspective may adopt a configuration in which the turning motor temperature sensor 54 detects a temperature value of the turning motor 29; the current integrated value acquiring unit 61 acquires a current integrated value of the turning motor 29; if the turning motor temperature sensor 54 is diagnosed as being in an abnormal state, the abnormality diagnostic unit 63 diagnoses whether the turning motor 29 is in an overload state on the basis of the turning motor current integrated value IA acquired by the current integrated value acquiring unit 61; and if the abnormality diagnostic unit 63 diagnoses the turning motor temperature sensor 54 as being in an abnormal state and also diagnoses the turning motor 29 as being in an overload state, the drive control unit (control unit) 65 controls the drive of the electromagnetic solenoid (switching actuator) 37 to bring the clutch device 19 into engagement.

In the vehicle steering apparatus 11 based on the third perspective, the turning motor temperature sensor 54 detects a temperature value of the turning motor 29, and the current integrated value acquiring unit 61 acquires a current integrated value of the turning motor 29. If the turning motor temperature sensor 54 is diagnosed as being in an abnormal state, the abnormality diagnostic unit 63 diagnoses whether the turning motor 29 is in an overload state on the basis of the turning motor current integrated value IA acquired by the current integrated value acquiring unit 61. If the abnormality diagnostic unit 63 diagnoses the turning motor temperature sensor 54 as being in an abnormal state and also diagnoses the turning motor 29 as being in an overload state on the basis of the turning motor current integrated value IA (e.g., if the turning motor current integrated value IA exceeds the second current integrated value threshold IAth2), the drive control unit (control unit) 65 controls the drive of the electromagnetic solenoid (switching actuator) 37 to bring the clutch device 19 into engagement.

According to the vehicle steering apparatus 11 based on the third perspective, in the event of an abnormality in the turning motor temperature sensor 54, a diagnosis of whether the turning motor 29 is in an overload state is made on the basis of the turning motor current integrated value IA, instead of the turning motor temperature value TV. Therefore, even in the event of an abnormality in the turning motor temperature sensor 54, a diagnosis of whether the turning motor 29 is in an overload state can be accurately made. As a result, since the period of SBW mode in which the clutch device 19 is in a disengaged state can be extended as much as possible, it is possible to contribute to improved reliability of the vehicle steering apparatus 11 having SBW mode as a steering mode, as in the vehicle steering apparatus 11 based on the first perspective.

The vehicle steering apparatus 11 based on a fourth perspective may adopt a configuration in which, during a period in which a current greater than a current threshold serving as a reference for determining whether one of the motors 16 and 29 can be heated flows through the one of the motors 16 and 29, the current integrated value acquiring unit 61 computes the time integral of the current, whereas during a period in which a current smaller than the current threshold flows through the one of the motors 16 and 29, the current integrated value acquiring unit 61 subtracts a current integrated value corresponding to a temperature decrease in this period, so as to acquire a current integrated value of the one of the motors 16 and 29.

According to the vehicle steering apparatus 11 based on the fourth perspective, in acquiring a current integrated value of one of the motors 16 and 29 in view of the fact that the magnitude of a motor current varies every moment, during a period in which a current greater than a current threshold APth serving as a reference for determining whether the one of the motors 16 and 29 can be heated flows through the one of the motors 16 and 29, the current integrated value acquiring unit 61 computes the time integral of the current, whereas during a period in which a current smaller than the current threshold current threshold APth flows through the one of the motors 16 and 29, the current integrated value acquiring unit 61 subtracts a current integrated value corresponding to a temperature decrease in this period, so as to acquire the current integrated value of the one of the motors 16 and 29.

According to the vehicle steering apparatus 11 based on the fourth perspective, in acquiring a current integrated value of one of the motors 16 and 29, a change history of increases and decreases in the magnitude of the motor current is reflected in the current integrated value. Therefore, as compared to the case of the vehicle steering apparatus 11 based on the first perspective, a diagnosis of whether the one of the motors 16 and 29 is in an overload state can be made more accurately and in a more timely manner.

The vehicle steering apparatus 11 based on a fifth perspective may adopt a configuration in which, if the abnormality diagnostic unit 63 diagnoses the steering reaction force motor temperature sensor 52 as being in an abnormal state and if the current integrated value of the steering reaction force motor 16 acquired by the current integrated value acquiring unit 61 exceeds the first current integrated value threshold serving as a reference for determining whether the steering reaction force motor 16 is normal but does not exceed the second current integrated value threshold (same as that in the example of the turning motor 29), the drive control unit (control unit) 65 controls the drive of the steering reaction force motor 16 while regulating the current supplied to the steering reaction force motor 16 in accordance with the current integrated value of the steering reaction force motor 16.

According to the vehicle steering apparatus 11 based on the fifth perspective, if a current integrated value of the steering reaction force motor 16 exceeds the first current integrated value threshold serving as a reference for determining whether the steering reaction force motor 16 is normal but falls within a region to be monitored, the region not exceeding the second current integrated value threshold (same as that in the example of the turning motor 29), the drive control unit (control unit) 65 controls the drive of the steering reaction force motor 16 while regulating the current supplied to the steering reaction force motor 16 in accordance with the steering reaction force motor current integrated value.

Regulating the current supplied to the steering reaction force motor 16 in accordance with the steering reaction force motor current integrated value when the current integrated value of the steering reaction force motor 16 falls within the region to be monitored means, for example, that as the steering reaction force motor current integrated value increases, the current supplied to the steering reaction force motor 16 is regulated to a value smaller than a standard target current value (i.e., regulated to a current with a magnitude appropriate for the load state of the steering reaction force motor 16). This makes the steering reaction force (resistance) smaller than usual, and thus provides the driver with a lighter operational feeling of the steering wheel 13.

According to the vehicle steering apparatus 11 based on the fifth perspective, a current appropriate for the load state of the steering reaction force motor 16 is supplied to the steering reaction force motor 16 while being regulated in accordance with variation in the steering reaction force motor current integrated value. This makes it possible to accurately carry out steering control in SBW mode.

The vehicle steering apparatus 11 based on a sixth perspective may adopt a configuration in which, if the abnormality diagnostic unit 63 diagnoses the turning motor temperature sensor 54 as being in an abnormal state and if the turning motor current integrated value IA acquired by the current integrated value acquiring unit 61 exceeds the first current integrated value threshold IAth1 serving as a reference for determining whether the turning motor 29 is normal but does not exceed the second current integrated value threshold IAth2, the drive control unit (control unit) 65 controls the drive of the turning motor 29 while regulating the current supplied to the turning motor 29 in accordance with the turning motor current integrated value IA.

According to the vehicle steering apparatus 11 based on the sixth perspective, if the turning motor current integrated value IA exceeds the first current integrated value threshold IAth1 serving as a reference for determining whether the turning motor 29 is normal but falls within a region to be monitored, the region not exceeding the second current integrated value threshold IAth2, the drive control unit (control unit) 65 controls the drive of the turning motor 29 while regulating the current supplied to the turning motor 29 in accordance with the turning motor current integrated value IA.

Regulation of the turning motor 29 in SBW mode includes the concept of making the turning angle of the turning wheels 21a and 21b with respect to the steering angle of the steering wheel 13 smaller than that (the turning angle of the turning wheels 21a and 21b with respect to the steering angle of the steering wheel 13) when the turning motor current integrated value IA does not exceed the first current integrated value threshold IAth1.

Regulating the current supplied to the turning motor 29 in accordance with the turning motor current integrated value IA when the turning motor current integrated value IA falls within the region to be monitored means, for example, that as the turning motor current integrated value IA increases, the current supplied to the turning motor 29 is regulated to a value smaller than a standard target current value (i.e., regulated to a current with a magnitude appropriate for the load state of the turning motor 29). This makes the steering angle ratio, which is the ratio of the turning angle of the turning wheels 21a and 21b to the steering angle of the steering wheel 13, and thus makes the driver feel that the turning angle of the turning wheels 21a and 21b with respect to the amount of steering of the steering wheel 13 has become smaller.

In the vehicle steering apparatus 11 based on the sixth perspective, a current appropriate for the load state of the turning motor 29 is supplied to the turning motor 29 while being regulated in accordance with variation in the turning motor current integrated value IA. This makes it possible to accurately carry out steering control in SBW mode.

Other Embodiments

The embodiments described above are exemplary embodiments of the present disclosure. The technical scope of the present disclosure is not to be interpreted in a limited sense by the embodiments described above. The present disclosure can be implemented in various forms without departing from the scope and main features thereof.

For example, although the clutch device 19 including the planetary gear mechanism 31 is provided in an embodiment of the present disclosure described above, the present disclosure is not limited to this. The clutch device 19 may have any configuration that allows engagement and disengagement between the steering shaft 23 and the turning shaft 25.

Although the turning motor 29 is shown as an exemplary motor for steering the vehicle V in an embodiment of the present disclosure described above, the present disclosure is not limited to this. The present disclosure may be configured by using the steering reaction force motor 16, either alone or in combination with the turning motor 29, as a motor for steering the vehicle V.

As a maximum rated current characteristic exhibited by the motors (steering reaction force motor 16 and turning motor 29) for steering the vehicle V, a characteristic which gradually decreases the maximum rated current of the motor as the integrated value of the motor current increases may be adopted.

An embodiment of the present disclosure describes a configuration in which, if a current integrated value of the steering reaction force motor 16 (turning motor 29) exceeds the first current integrated value threshold IAth1 serving as a reference for determining whether the steering reaction force motor 16 (turning motor 29) is normal but does not exceed the second current integrated value threshold IAth2, the drive control unit 65 controls the drive of the steering reaction force motor 16 (turning motor 29) while regulating the current supplied to the steering reaction force motor 16 (turning motor 29) in accordance with the current integrated value of the steering reaction force motor 16 (turning motor 29). However, the present disclosure is not limited to this.

In a manner similar to the example described above, the present disclosure may adopt a configuration in which, if a motor temperature value exceeds the first motor temperature threshold serving as a reference for determining whether the steering reaction force motor 16 (turning motor 29) is normal but does not exceed the second motor temperature threshold, the drive control unit 65 controls the drive of the steering reaction force motor 16 (turning motor 29) while regulating the current supplied to the steering reaction force motor 16 (turning motor 29) in accordance with a temperature threshold for the steering reaction force motor 16 (turning motor 29).

What is claimed is:
1. A vehicle steering apparatus comprising:
a steering unit including a steering reaction force motor capable of applying a steering reaction force to a steering member operated for turning a turning wheel of a vehicle;
a turning unit including a turning motor configured to apply a turning force for turning the turning wheel, the turning unit being capable of turning the turning wheel while being mechanically disengaged from the steering unit;
a clutch device including a switching actuator configured to mechanically engage and disengage between the steering unit and the turning unit;
a temperature sensor configured to detect a temperature value of a temperature of one of the steering reaction force motor and the turning motor; and a control device configured to acquire a current integrated value of a current of the one of the steering reaction force motor and the turning motor, the control device configured to control, when the clutch device is in a disengaged state, drive of the turning motor such that a turning angle is in accordance with an operating state of the steering member and drive of the steering reaction force motor such that a steering reaction force in accordance with a turning state of the turning unit is applied, wherein the control device is configured to diagnose whether the temperature sensor is in a normal state:

when the control device diagnoses the temperature sensor as being in a normal state, the control device controls drive of the switching actuator by using the temperature value of the one of the steering reaction force motor and the turning motor detected by the temperature sensor, whereas when the control device diagnoses the temperature sensor as being in an abnormal state, the control device controls drive of the switching actuator by using the current integrated value of the current of the one of the steering reaction force motor and the turning motor acquired by the control device, wherein the temperature sensor detects the temperature value of the steering reaction force motor, wherein the control device acquires the current integrated value of the current of the steering reaction force motor, wherein when the temperature sensor is diagnosed as being in the abnormal state, the control device diagnoses whether the steering reaction force motor is in an overload state based on the current integrated value of the current of the steering reaction force motor acquired by the control device:

when the control device diagnoses the temperature sensor as being in the abnormal state and diagnoses the steering reaction force motor as being in the overload state, the control device controls drive of the switching actuator to bring the clutch device into engagement, wherein when the control device diagnoses the temperature sensor as being in the abnormal state and when the current integrated value of the current of the steering reaction force motor acquired by the control device exceeds a first current integrated value threshold serving as a reference for determining whether the steering reaction force motor is normal but does not exceed a second current integrated value threshold, the control device controls drive of the steering reaction force motor while regulating the current supplied to the steering reaction force motor in accordance with the current integrated value of the current of the steering reaction force motor.

2. The vehicle steering apparatus according to claim 1, the first current integrated value threshold indicates that the steering reaction force motor is in a heavy load state and the second current integrated value threshold indicates that the steering reaction force motor is in an overload state.

3. The vehicle steering apparatus according to claim 1, the control device controls the drive of the steering reaction force motor while regulating the current supplied to the steering reaction force motor such that the current supplied to the steering reaction force motor decreases as the current integrated value of the current of the steering reaction force motor increases.

4. The vehicle steering apparatus according to claim 1, wherein during a period in which the current greater than a current threshold flows through the one of the steering reaction force motor and the turning motor, the control device computes a time integral of the current, the current threshold serving as a reference for determining whether the one of the steering reaction force motor and the turning motor is capable to be heated, whereas during another period in which the current smaller than the current threshold flows through the one of the steering reaction force motor and the turning motor, the control device subtracts a first current integrated value corresponding to a temperature decrease in the another period, so as to acquire the current integrated value of the current of the one of the steering reaction force motor and the turning motor.

5. A vehicle steering apparatus comprising:

a steering unit including a steering reaction force motor capable of applying a steering reaction force to a steering member operated for turning a turning wheel of a vehicle;

a turning unit including a turning motor configured to apply a turning force for turning the turning wheel, the turning unit being capable of turning the turning wheel while being mechanically disengaged from the steering unit;

a clutch device including a switching actuator configured to mechanically engage and disengage between the steering unit and the turning unit;

a temperature sensor configured to detect a temperature value of a temperature of one of the steering reaction force motor and the turning motor; and a control device configured to acquire a current integrated value of a current of the one of the steering reaction force motor and the turning motor, the control device configured to control, when the clutch device is in a disengaged state, drive of the turning motor such that a turning angle is in accordance with an operating state of the steering member and drive of the steering reaction force motor such that a steering reaction force in accordance with a turning state of the turning unit is applied, wherein the control device is configured to diagnose whether the temperature sensor is in a normal state:

when the control device diagnoses the temperature sensor as being in a normal state, the control device controls drive of the switching actuator by using the temperature value of the one of the steering reaction force motor and the turning motor detected by the temperature sensor, whereas when the control device diagnoses the temperature sensor as being in an abnormal state, the control device controls drive of the switching actuator by using the current integrated value of the current of the one of the steering reaction force motor and the turning motor acquired by the control device, wherein the temperature sensor detects the temperature value of the turning motor, the control device acquires the current integrated value of the turning motor, wherein when the temperature sensor is diagnosed as being in the abnormal state, the control device diagnoses whether the turning motor is in an overload state based on the current integrated value of the current of the turning motor acquired by the control device; and when the control device diagnoses the temperature sensor as being in the abnormal state and diagnoses the turning motor as being in the overload state, the control device controls drive of the switching actuator to bring the clutch device into engagement, wherein when the control device diagnoses the temperature sensor as being in the abnormal state and when the current integrated value of the current of the turning motor acquired by the control device exceeds a first current integrated value threshold serving as a reference for determining whether the turning motor is normal but does not exceed a second current integrated value threshold, the control device controls drive of the turning motor while regulating the current supplied to the turning motor in accordance with the current integrated value of the current of the turning motor.

6. The vehicle steering apparatus according to claim 5, the first current integrated value threshold indicates that the turning motor is in a heavy load state and the second current integrated value threshold indicates that the turning motor is in an overload state.

7. The vehicle steering apparatus according to claim 5, the control device controls the drive of the turning motor while regulating the current supplied to the turning motor such that the current supplied to the turning motor decreases as the current integrated value of the current of the turning motor increases.

8. The vehicle steering apparatus according to claim 5, wherein during a period in which the current greater than a current threshold flows through the one of the steering reaction force motor and the turning motor, the control device computes a time integral of the current, the current threshold serving as a reference for determining whether the one of the steering reaction force motor and the turning motor is capable to be heated, whereas during another period in which the current smaller than the current threshold flows through the one of the steering reaction force motor and the turning motor, the control device subtracts a first current integrated value corresponding to a temperature decrease in the another period, so as to acquire the current integrated value of the current of the one of the steering reaction force motor and the turning motor.

9. A method of controlling a vehicle steering apparatus comprising:
   acquiring, by using a controller, a current integrated value of a current of the one of a steering reaction force motor and a turning motor, the steering reaction force motor capable of applying a steering reaction force to a steering member operated for turning a turning wheel of a vehicle, the turning motor configured to apply a turning force for turning the turning wheel, the turning motor being capable of turning the turning wheel while being mechanically disengaged from the steering member;
   controlling, by using the controller, when a clutch device mechanically disengages a steering device including the steering member from a turning device including the turning motor, the turning motor such that a turning angle is in accordance with an operating state of the steering member and the steering reaction force motor such that a steering reaction force in accordance with a turning state of the turning device is applied; and
   diagnosing, by using the controller, whether a temperature sensor is in a normal state, the temperature sensor being configured to detect a temperature value of a temperature of one of the steering reaction force motor and the turning motor:
      when the temperature sensor is diagnosed as in a normal state, controlling, by using the controller, the clutch device by using the temperature value of the one of the steering reaction force motor and the turning motor detected by the temperature sensor, whereas when the temperature sensor is diagnosed in an abnormal state, controlling, by using the controller, the clutch device by using the current integrated value of the current of the one of the steering reaction force motor and the turning motor acquired by the controller,
      when the temperature sensor is diagnosed as being in the abnormal state, diagnosing, by using the controller, whether the steering reaction force motor is in an overload state based on the acquired current integrated value of the current of the steering reaction force motor, and
      when the temperature sensor is diagnosed as being in the abnormal state and the steering reaction force motor is diagnosed as being in the overload state, engaging the clutch device by using the controller,
   wherein the method further comprises:
      when the temperature sensor is diagnosed as being in the abnormal state and when the acquired current integrated value of the current of the steering reaction force motor exceeds a first current integrated value threshold serving as a reference for determining whether the steering reaction force motor is normal but does not exceed a second current integrated value threshold, controlling, by using the controller, drive of the steering reaction force motor while regulating the current supplied to the steering reaction force motor in accordance with the current integrated value of the current of the steering reaction force motor.

10. A method of controlling a vehicle steering apparatus comprising:
   acquiring, by using a controller, a current integrated value of a current of the one of a steering reaction force motor and a turning motor, the steering reaction force motor capable of applying a steering reaction force to a steering member operated for turning a turning wheel of a vehicle, the turning motor configured to apply a turning force for turning the turning wheel, the turning motor being capable of turning the turning wheel while being mechanically disengaged from the steering member;
   controlling, by using the controller, when a clutch device mechanically disengages a steering device including the steering member from a turning device including the turning motor, the turning motor such that a turning angle is in accordance with an operating state of the steering member and the steering reaction force motor such that a steering reaction force in accordance with a turning state of the turning device is applied; and
   diagnosing, by using the controller, whether a temperature sensor is in a normal state, the temperature sensor being configured to detect a temperature value of a temperature of one of the steering reaction force motor and the turning motor:
      when the temperature sensor is diagnosed as in a normal state, controlling, by using the controller, the clutch device by using the temperature value of the one of the steering reaction force motor and the turning motor detected by the temperature sensor, whereas when the temperature sensor is diagnosed in an abnormal state, controlling, by using the controller, the clutch device by using the current integrated value of the current of the one of the steering reaction force motor and the turning motor acquired by the controller, when the temperature sensor is diagnosed as being in the abnormal state, diagnosing, by using the controller, whether the turning motor is in an overload state based on the acquired current integrated value of the current of the turning motor, and when the temperature sensor is diagnosed as being in the abnormal state and the turning motor is diagnosed as being in the overload state, engaging the clutch device by using the controller, wherein the method further comprises:

when the temperature sensor is diagnosed as being in the abnormal state and when the acquired current integrated value of the current of the turning motor exceeds a first current integrated value threshold serving as a reference for determining whether the turning motor is normal but does not exceed a second current integrated value threshold, controlling, by using the controller, drive of the turning motor while regulating the current supplied to the turning motor in accordance with the current integrated value of the current of the turning motor.

* * * * *